United States Patent
Komatsu et al.

(10) Patent No.: US 10,773,773 B2
(45) Date of Patent: Sep. 15, 2020

(54) ELECTRIC BICYCLE DERAILLEUR

(71) Applicant: Shimano Inc., Sakai, Osaka (JP)

(72) Inventors: Atsushi Komatsu, Osaka (JP); Shingo Sakurai, Osaka (JP)

(73) Assignee: Shimano Inc., Osaka (JP)

( * ) Notice: Subject to any disclaimer, the term of this patent is extended or adjusted under 35 U.S.C. 154(b) by 247 days.

(21) Appl. No.: 15/616,746

(22) Filed: Jun. 7, 2017

(65) Prior Publication Data

US 2018/0354586 A1    Dec. 13, 2018

(51) Int. Cl.
  *B62M 9/122*  (2010.01)
  *B62M 9/1242*  (2010.01)
  *B62M 25/08*  (2006.01)

(52) U.S. Cl.
  CPC .......... *B62M 9/122* (2013.01); *B62M 9/1242* (2013.01); *B62M 25/08* (2013.01)

(58) Field of Classification Search
  CPC ...... B62M 9/122; B62M 25/08; B62M 9/132; B62K 23/02; B62J 2099/002
  USPC ....................................... 474/80, 82
  See application file for complete search history.

(56) References Cited

U.S. PATENT DOCUMENTS

| | | | | |
|---|---|---|---|---|
| 4,490,127 A * | 12/1984 | Matsumoto | ............ | B62M 9/122 280/236 |
| 5,425,678 A * | 6/1995 | Richardson | .......... | B62M 9/1342 280/261 |
| 5,961,409 A * | 10/1999 | Ando | ................ | B62M 9/1244 474/80 |
| 6,162,140 A * | 12/2000 | Fukuda | ................ | B62M 9/122 474/70 |
| 6,623,389 B1 * | 9/2003 | Campagnolo | .......... | B62M 9/122 474/70 |
| 6,659,895 B2 * | 12/2003 | Fukuda | ................ | B62M 9/122 324/168 |
| 7,824,285 B2 * | 11/2010 | Tan | ........................ | B62M 9/127 474/80 |
| 7,892,122 B2 * | 2/2011 | Fukuda | ................ | B62M 25/08 474/80 |
| 7,980,974 B2 * | 7/2011 | Fukuda | ................ | B62M 9/122 474/70 |
| 8,655,561 B2 * | 2/2014 | Kitamura | ............... | B62M 25/08 701/51 |
| 8,721,495 B2 * | 5/2014 | Kitamura | .................. | B62J 6/06 477/7 |

(Continued)

FOREIGN PATENT DOCUMENTS

CN    103723238 A    4/2014
CN    204750467 U    11/2015

*Primary Examiner* — Henry Y Liu
(74) *Attorney, Agent, or Firm* — Global IP Counselors, LLP

(57) ABSTRACT

An electrical bicycle derailleur is basically provided with a base member, a movable member, at least one link member, a motor unit and a wireless unit. The base member is configured to be mounted to a bicycle frame. The movable member is movably arranged relative to the base member. The at least one link member movably connects the base member and the movable member. The motor unit is disposed on one of the base member, the movable member, and the at least one link member. The motor unit includes a motor configured to move the at least one link member. The wireless unit includes a wireless receiver configured to receive a wireless signal, the wireless unit being disposed on the at least one link member.

26 Claims, 11 Drawing Sheets

(56) References Cited

U.S. PATENT DOCUMENTS

| | | | | |
|---|---|---|---|---|
| 8,882,618 B2* | 11/2014 | Yamaguchi | ............ | B62M 9/122 |
| | | | | 474/80 |
| 8,900,078 B2* | 12/2014 | Yamaguchi | .......... | B62M 9/1244 |
| | | | | 474/80 |
| 9,802,669 B2* | 10/2017 | Jordan | ................... | B62K 23/02 |
| 2014/0087901 A1* | 3/2014 | Shipman | ................ | B62M 9/132 |
| | | | | 474/82 |
| 2016/0311500 A1* | 10/2016 | Kasai | ....................... | B62M 6/45 |
| 2016/0339986 A1* | 11/2016 | Jordan | ................... | B62K 23/02 |
| 2017/0008465 A1* | 1/2017 | Kasai | ..................... | B62M 9/122 |
| 2017/0101155 A1* | 4/2017 | Tachibana | ............... | H04W 4/70 |
| 2017/0101162 A1* | 4/2017 | Tachibana | .............. | B62M 25/08 |
| 2017/0113759 A1* | 4/2017 | Watarai | ................. | B62M 9/122 |
| 2017/0120983 A1* | 5/2017 | Komatsu | ................ | B62M 9/122 |
| 2017/0197685 A1* | 7/2017 | Braedt | ................... | B62M 9/122 |
| 2018/0229803 A1* | 8/2018 | Wesling | ................ | B62M 9/122 |

* cited by examiner

ELECTRIC BICYCLE DERAILLEUR

BACKGROUND

Field of the Invention

This invention generally relates to an electric bicycle derailleur. More specifically, the present invention relates to an electric bicycle derailleur having a wireless unit.

Background Information

Generally, a bicycle typically uses a bicycle drive train for transmitting a pedaling force to a rear wheel. The drive train of a bicycle often uses one or two derailleurs to selectively move a bicycle chain from one of a plurality of sprockets to another for changing speeds of the bicycle. Some bicycle derailleurs are provided with electrical components or devices to make it easier for the rider to operate the bicycle derailleur. Such bicycle electrical component can include a motor unit, a wireless unit, and/or a power source.

SUMMARY

Generally, the present disclosure is directed to various features of an electric bicycle derailleur having a wireless unit. In one feature, an electric bicycle derailleur has a wireless unit disposed on a link member.

In view of the state of the known technology and in accordance with a first aspect of the present disclosure, an electrical bicycle derailleur is basically provided with a base member, a movable member, at least one link member, a motor unit and a wireless unit. The base member is configured to be mounted to a bicycle frame. The movable member is movably arranged relative to the base member. The at least one link member movably connects the base member and the movable member. The motor unit is disposed on one of the base member, the movable member and the at least one link member. The motor unit includes a motor configured to move the at least one link member. The wireless unit includes a wireless receiver configured to receive a wireless signal. The wireless unit is disposed on the at least one link member. Advantageously according to the first aspect, the electrical bicycle derailleur is configured to provide a wireless unit such that the electric bicycle derailleur is compact.

In accordance with a second aspect of the present invention, an electric bicycle derailleur is basically provided with a base member, a movable member, at least one link member, a motor unit and a wireless unit. The base member is configured to be mounted to a bicycle frame. The movable member is movably arranged relative to the base member. The at least one link member movably connects the base member and the movable member. The motor unit includes a motor configured to move the movable member relative to the base member. The wireless unit includes a wireless receiver configured to receive a wireless signal. The wireless unit is disposed on the at least one link member. Advantageously according to the second aspect, the electrical bicycle derailleur is configured to provide a wireless unit such that the electric bicycle derailleur is compact.

In accordance with a third aspect of the present invention, the electric bicycle derailleur according to any one of the first aspect and the second aspect is configured so that the motor unit is disposed on the base member. Advantageously according to the third aspect, the electrical bicycle derailleur is configured to provide a wireless unit such that the electric bicycle derailleur is compact.

In accordance with a fourth aspect of the present invention, the electric bicycle derailleur according to the third aspect is configured so that the at least one link member includes a first link member and a second link member. The second link member is positioned from the bicycle frame farther than the first link member from the bicycle frame in a state where the electric bicycle derailleur is mounted to the bicycle frame. Advantageously according to the fourth aspect, the electrical bicycle derailleur is configured to provide a wireless unit such that the electric bicycle derailleur is compact.

In accordance with a fifth aspect of the present invention, the electric bicycle derailleur according to the fourth aspect is configured so that the wireless unit is disposed on the first link member. Advantageously according to the fifth aspect, the electrical bicycle derailleur is configured to provide a sufficient distance between a wireless unit and the ground.

In accordance with a sixth aspect of the present invention, the electric bicycle derailleur according to the fifth aspect is configured so that the wireless unit is disposed on a first inner surface of the first link member. The first inner surface faces the second link member in a state where the electric bicycle derailleur is mounted to the bicycle frame. Advantageously according to the sixth aspect, the electrical bicycle derailleur is configured to provide a sufficient distance between a wireless unit and the ground.

In accordance with a seventh aspect of the present invention, the electric bicycle derailleur according to the fourth aspect is configured so that the wireless unit is disposed on the second link member. Advantageously according to the seventh aspect, the electrical bicycle derailleur is configured to provide a wireless unit that will be less likely to interfere with a bicycle chain and/or a bicycle sprocket in a state where the electrical bicycle derailleur is mounted to the bicycle frame.

In accordance with an eighth aspect of the present invention, the electric bicycle derailleur according to the seventh aspect is configured so that the wireless unit is disposed on a second inner surface of the second link member that faces the first link member in a state where the electric bicycle derailleur is mounted to the bicycle frame. Advantageously according to the eighth aspect, the electrical bicycle derailleur is configured to provide a wireless unit that will be less likely to interfere with a bicycle chain and/or a bicycle sprocket in a state where the electrical bicycle derailleur is mounted to the bicycle frame.

In accordance with a ninth aspect of the present invention, the electric bicycle derailleur according to any one of the first aspect and the second aspect is configured so that the motor unit is disposed on the movable member. Advantageously according to the ninth aspect, the electrical bicycle derailleur is configured to provide a wireless unit such that the electric bicycle derailleur is compact.

In accordance with a tenth aspect of the present invention, the electric bicycle derailleur according to the ninth aspect is configured so that the at least one link member includes a first link member and a second link member. The second link member is positioned from the bicycle frame farther than the first link member from the bicycle frame in a state where the electric bicycle derailleur is mounted to the bicycle frame. Advantageously according to the tenth aspect, the electrical bicycle derailleur is configured to provide a wireless unit such that the electric bicycle derailleur is compact.

In accordance with an eleventh aspect of the present invention, the electric bicycle derailleur according to the tenth aspect is configured so that the wireless unit is disposed on the first link member. Advantageously according to the eleventh aspect, the electrical bicycle derailleur is configured to provide a sufficient distance between a wireless unit and the ground.

In accordance with a twelfth aspect of the present invention, the electric bicycle derailleur according to the eleventh aspect is configured so that the wireless unit is disposed on a first inner surface of the first link member. The first inner surface faces the second link member in a state where the electric bicycle derailleur is mounted to the bicycle frame. Advantageously according to the twelfth aspect, the electrical bicycle derailleur is configured to provide a sufficient distance between a wireless unit and the ground.

In accordance with a thirteenth aspect of the present invention, the electric bicycle derailleur according to the tenth aspect is configured so that the wireless unit is disposed on the second link member. Advantageously according to the thirteenth aspect, the electrical bicycle derailleur is configured to provide a wireless unit that will be less likely to interfere with a bicycle chain and/or a bicycle sprocket in a state where the electrical bicycle derailleur is mounted to the bicycle frame.

In accordance with a fourteenth aspect of the present invention, the electric bicycle derailleur according to the thirteenth aspect is configured so that the wireless unit is disposed on a second inner surface of the second link member. The second inner surface faces the first link member in a state where the electric bicycle derailleur is mounted to the bicycle frame. Advantageously according to the fourteenth aspect, the electrical bicycle derailleur is configured to provide a wireless unit that will be less likely to interfere with a bicycle chain and/or a bicycle sprocket in a state where the electrical bicycle derailleur is mounted to the bicycle frame.

In accordance with a fifteenth aspect of the present invention, the electric bicycle derailleur according to any one of the first aspect and the second aspect is configured so that the motor unit is disposed on the at least one link member. Advantageously according to the fifteenth aspect, the electrical bicycle derailleur is configured to provide a wireless unit such that the electric bicycle derailleur is compact.

In accordance with a sixteenth aspect of the present invention, the electric bicycle derailleur according to the fifteenth aspect is configured so that the at least one link member includes a first link member and a second link member. The second link member is positioned from the bicycle frame farther than the first link member from the bicycle frame in a state where the electric bicycle derailleur is mounted to the bicycle frame. Advantageously according to the sixteenth aspect, the electrical bicycle derailleur is configured to provide a wireless unit such that the electric bicycle derailleur is compact.

In accordance with a seventeenth aspect of the present invention, the electric bicycle derailleur according to the sixteenth aspect is configured so that the wireless unit is disposed on the first link member. Advantageously according to the seventeenth aspect, the electrical bicycle derailleur is configured to provide a wireless unit that is less likely to hit the ground if the bicycle having the electric bicycle derailleur falls over.

In accordance with an eighteenth aspect of the present invention, the electric bicycle derailleur according to the seventeenth aspect is configured so that the wireless unit is disposed on a first inner surface of the first link member. The first inner surface faces the second link member in a state where the electric bicycle derailleur is mounted to the bicycle frame. Advantageously according to the eighteenth aspect, the electrical bicycle derailleur is configured to provide a sufficient distance between a wireless unit and the ground.

In accordance with a nineteenth aspect of the present invention, the electric bicycle derailleur according to the seventeenth aspect is configured so that the motor unit is disposed on the first link member. Advantageously according to the nineteenth aspect, the electrical bicycle derailleur is configured to provide a sufficient distance between a wireless unit and the ground.

In accordance with a twentieth aspect of the present invention, the electric bicycle derailleur according to the sixteenth aspect is configured so that the wireless unit is disposed on the second link member. Advantageously according to the twentieth aspect, the electrical bicycle derailleur is configured to provide a wireless unit that will be less likely to interfere with a bicycle chain and/or a bicycle sprocket in a state where the electrical bicycle derailleur is mounted to the bicycle frame.

In accordance with a twenty-first aspect of the present invention, the electric bicycle derailleur according to the twentieth aspect is configured so that the wireless unit is disposed on a second inner surface of the second link member. The second inner surface faces the first link member in a state where the electric bicycle derailleur is mounted to the bicycle frame. Advantageously according to the twenty-first aspect, the electrical bicycle derailleur is configured to provide a wireless unit that will be less likely to interfere with a bicycle chain and/or a bicycle sprocket in a state where the electrical bicycle derailleur is mounted to the bicycle frame.

In accordance with a twenty-second aspect of the present invention, the electric bicycle derailleur according to the twentieth is configured so that the motor unit is disposed on the second link member. Advantageously according to the twenty-second aspect, the electrical bicycle derailleur is configured to provide a sufficient distance between a wireless unit and the ground.

In accordance with a twenty-third aspect of the present invention, the electric bicycle derailleur according to any one of the first aspect to the twenty-second aspect further comprises an electric conductor electrically connecting the wireless unit and the motor unit. Advantageously according to the twenty-third aspect, the electrical bicycle derailleur is configured to provide a wireless unit such that the electric bicycle derailleur is compact.

In accordance with a twenty-fourth aspect of the present invention, the electric bicycle derailleur according to the twenty-third aspect is configured so that the electric conductor is at least partly disposed on the at least one link member. Advantageously according to the twenty-fourth aspect, the electrical bicycle derailleur is configured to provide a wireless unit while effectively using the space of the electrical bicycle derailleur.

In accordance with a twenty-fifth aspect of the present invention, the electric bicycle derailleur according to any one of the first aspect to the twenty-fourth aspect is configured so that the at least one link member is made from a radio wave transparent material. Advantageously according to the twenty-fifth aspect, the electrical bicycle derailleur is configured to improve the quality of wireless communication.

In accordance with a twenty-sixth aspect of the present invention, the electric bicycle derailleur according to the twenty-fifth aspect is configured so that the radio wave transparent material includes plastic. Advantageously according to the twenty-sixth aspect, the electrical bicycle derailleur is configured to improve the quality of wireless communication.

Also, other objects, features, aspects and advantages of the disclosed electric bicycle derailleur will become apparent to those skilled in the art from the following detailed description, which, taken in conjunction with the annexed drawings, discloses one embodiment of the electric bicycle derailleur.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Figure 1:
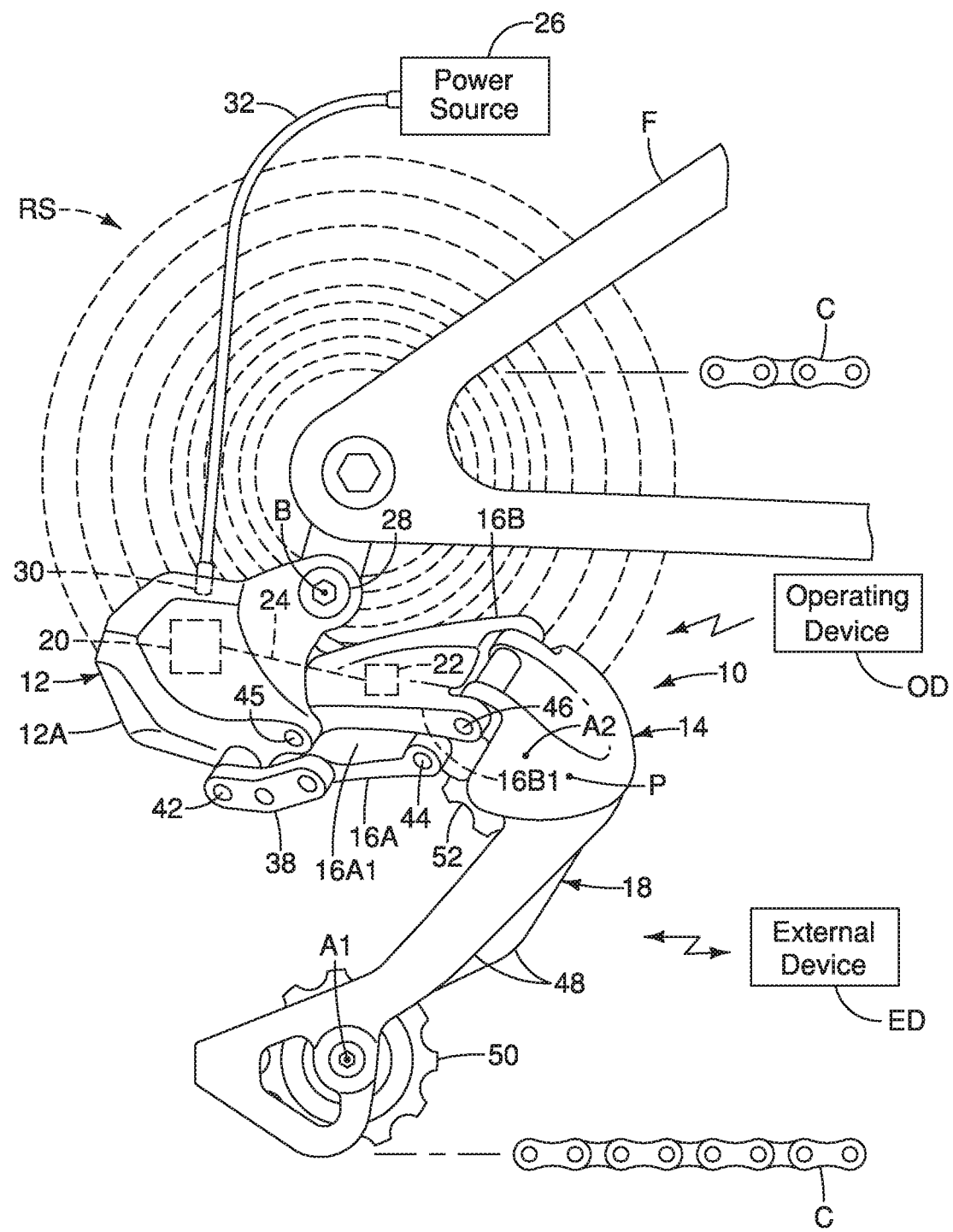
FIG. 1 is a side devotional view of a portion of a bicycle that is equipped with an electric bicycle derailleur having a motor unit disposed on a base member and a wireless unit disposed on an outer link, in accordance with a first illustrated embodiment.
Figure 2:
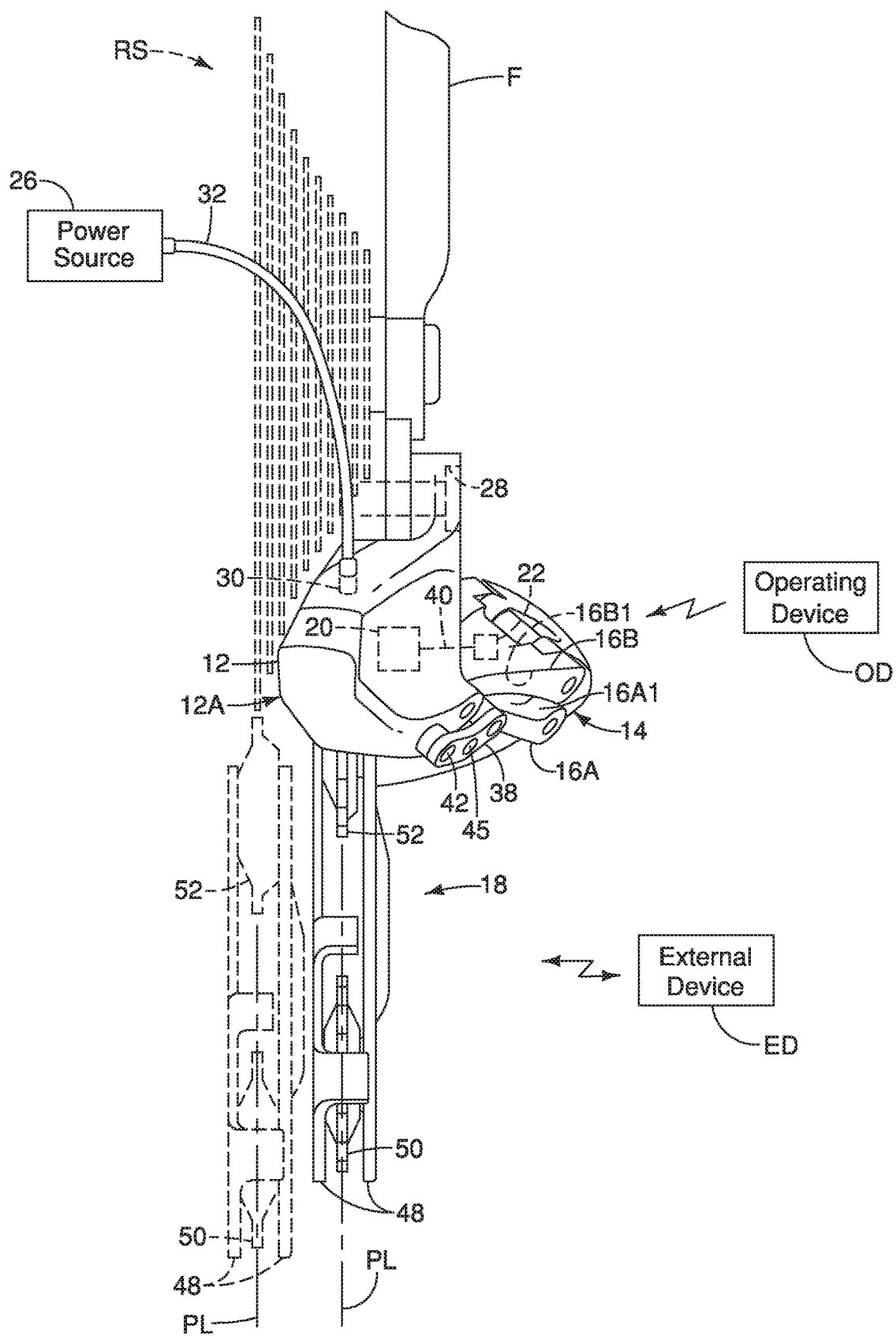
FIG. 2 is a rear elevational view of the portion of the bicycle equipped with the electric bicycle derailleur illustrated in FIG. 1, with an extended position of the electric bicycle derailleur illustrated in phantom lines.

Referring initially to FIGS. 1 and 2, a portion of a bicycle frame F is illustrated that is equipped with an electric bicycle derailleur 10 in accordance with a first embodiment. In the illustrated embodiment, the electric bicycle derailleur 10 is a bicycle rear derailleur. The electric bicycle derailleur 10 is mounted to the bicycle frame F of the bicycle. A rear wheel (not shown) has, a rear sprocket cassette RS that is rotatably supported on the bicycle frame F in a conventional manner. The electric bicycle derailleur 10 is configured to receive shift signals from an operating device OD (e.g., a shift operating device) to shift a chain C in a lateral direction with respect to a vertical center plane of the bicycle frame F.

The electric bicycle derailleur 10 comprises a base member 12, a movable member 14 and at least one link member 16A or 16B. Thus, the at least one link member includes the first link member 16A and the second link member 16B. As shown, the second link member 16B is positioned from the bicycle frame F farther than the first link member 16A from the bicycle frame F in a state where the electric bicycle derailleur 10 is mounted to the bicycle frame F. In the illustrated embodiment, the at least one link member 16A or 16B movably connect the base member 12 and the movable member 14. Here, the electric bicycle derailleur 10 has two link members (i.e., the first (inner) link member 16A and the second (outer) link member 16B). The first and second link members 16A and 16B enable relative movement of the movable member 14 with respect to the base member 12 as the electric bicycle derailleur 10 shifts the chain C in the lateral direction. The electric bicycle derailleur 10 further comprises a chain guide 18 movably coupled to the movable member 14. The electric bicycle derailleur 10 further comprises a motor unit 20. The electric bicycle derailleur 10 further comprises a wireless unit 22. The electric bicycle derailleur 10 further comprises an electric conductor 24 (e.g. an electric cable) electrically connecting the wireless unit 22 and the motor unit 20. The electric bicycle derailleur 10 further comprises a power source 26 (e.g., a battery) that supplies power to the motor unit 20 and/or the wireless unit 22, as will be further discussed below. In the illustrated embodiment, the wireless unit 22 is disposed on the first link member 16A. However, it will be apparent from this disclosure that the wireless unit 22 is disposed on the at least one link member 16A or 16B. This arrangement of the electric bicycle derailleur 10 with the wireless unit 22 on at least one of the first and second link members 16A and 16B allows the electric bicycle derailleur 10 to be more compact and provides more protection for the wireless unit 22.

The base member 12 is configured to be mounted to the bicycle frame F. In particular, the base member 12 includes a frame mounting structure, such as a fixing bolt 28 that is configured to be attached to the bicycle frame F. The base member 12 is preferably constructed of a rigid material such as a lightweight metal (e.g., an aluminum alloy or a fiber reinforced plastic). Preferably, the base member 12 is pivotally mounted on the fixing bolt 28 that defines a pivot axis B. The pivot axis B is sometimes called the B-axis. The base member 12 can also include a posture adjusting bolt (not shown) for adjusting the posture of the base member 12 about the B-axis in a conventional manner. Also, the base member 12 pivotally supports one end of each of the first and second link members 16A and 16B.

The base member 12 has a housing 12A that is stationary with respect to the bicycle frame F when the chain guide 18 is moved to shift the bicycle chain C. In the first embodiment, the motor unit 20 is disposed on the housing 12A of the base member 12. For example, as shown, the motor unit 20 is disposed inside the housing 12A of the base member 12 in a conventional manner. Alternatively, the motor unit 20 can be pivotally attached to the housing 12A, as disclosed in U.S. Pat. No. 6,162,140. In either case, the motor unit 20 is supported by the base member 12.

As shown, the base member 12 includes a connector 30 that receives a power line 32 for electrically connecting the base member 12 to the power source 26. Thus, the power source 26 is electrically connected to the motor unit 20 by the power line 32 to supply electricity to the motor unit 20 and/or the wireless unit 22. Here, the power source 26 is a remote battery. Alternatively, the power source 26 can be detachably mounted to the base member 12 as a separate part on the base member 12. The power source 26 can be any suitable electrical power source such as a capacitor, a rechargeable electrical battery, a disposable electrical battery, a fuel cell battery, etc.

The first and second link members 16A and 16B will now be discussed. The first and second link members 16A and 16B operatively couple the movable member 14 to the base member 12 to enable relative movement of the movable member 14 with respect to the base member 12. In the illustrated embodiment, the first link member 16A has a first inner surface 16A1. The first inner surface 16A1 of the first link member 16A faces the second link member 16B in a state where the electric bicycle derailleur 10 is mounted to the bicycle frame F. The second link member 16B includes a second inner surface 16B1. The second inner surface 16B1 of the second link member 16B faces the first link member 16A in a state where the electric bicycle derailleur 10 is mounted to the bicycle frame F. The first and second link members 16A and 16B preferably further includes a biasing member (not shown) that is interposed between the first and second link members 16A and 16B to take up the play in a gear reduction mechanism 56 (FIG. 3) of the motor unit 20.

The first and second link members 16A and 16B are pivotally connected to the base member 12 and the movable member 14. In particular, the first link member 16A has a first end that is pivotally connected to a saver link 38. The saver link 38 is part of a saver link mechanism which connects to an output shaft 42 of the motor unit 20. Thus the output shaft 42 acts as a pivot pin that pivots the first link member 16A and the saver link 38 together.

Further, the first link member 16A has a second end that is pivotally connected to the movable member 14 by a pivot pin. The second link member 16B has a first end that is pivotally connected to the base member 12 by a pivot pin. The second link member 16B has a second end that is pivotally connected to the movable member 14 by a pivot pin. Thus, the first and second link members 16A and 16B have first ends pivotally connected to the base member 12 and second ends pivotally connected to the movable member 14 to define a four bar linkage arrangement.

Preferably, the first link member 16A is made of a radio wave transparent material. In the alternative, the second link member 16B is made of a radio wave transparent material. More preferably, both the first and second link members 16A and 16B are also made of a radio wave transparent material. Thus, at least one link member 16A or 16B is made from a radio wave transparent material to support the wireless unit 18. In the illustrated embodiment, the first and second link members 16A and 16B are constructed of a suitable rigid material such as a fiber reinforced plastic. Thus, in the illustrated embodiment, the radio wave transparent material includes plastic. In other words, the first and second link members 16A and 16B are constructed of a radio wave transparent material such as plastic.

The movable member 14 and the chain guide 18 will now be discussed. The movable member 14 is movably arranged relative to the base member 12 to move the chain guide 18 between a retracted position and an extended position. The chain guide 18 is coupled to the first and second link members 16A and 16B by the movable member 14, which is constructed of a suitable rigid material such as an aluminum alloy or a fiber reinforced plastic. In particular, the chain guide 18 is pivotally mounted to the movable member 14 by an axle (not shown) to pivot about a chain guide pivot axis P, which is sometimes called the P-axis. As seen in FIG. 2, the chain guide 18 is pivotally supported with respect to the base member 12 between a retracted position and an extended position by the first and second link members 16A and 16B. Since the electric bicycle derailleur 10 is used with the rear sprocket cassette RS that has the plurality of sprockets, the chain guide 18 can move to a plurality of retracted positions with respect to the fully extended positon. Of course, the chain guide 18 can be considered to have a plurality of extended positons with respect to the fully retracted position of the chain guide 18, which corresponds to when the pulleys of the chain guide 18 are aligned with the largest rear sprocket.

The chain guide 18 basically includes a pair of chain cage plates 48, a tension pulley 50 and a guide pulley 52. The pulleys 50 and 52 are both rotatably disposed between the chain cage plates 48. The tension pulley 50 rotates around a first pulley axis A1 in a center pulley plane PL that bisects the tension pulley 50. The guide pulley 52 rotates around a second pulley axis A2 in the center pulley plane PL that bisects the guide pulley 52. Thus, in this illustrated embodiment, the pulleys 50 and 52 have the same center pulley plane PL.

Figure 3:
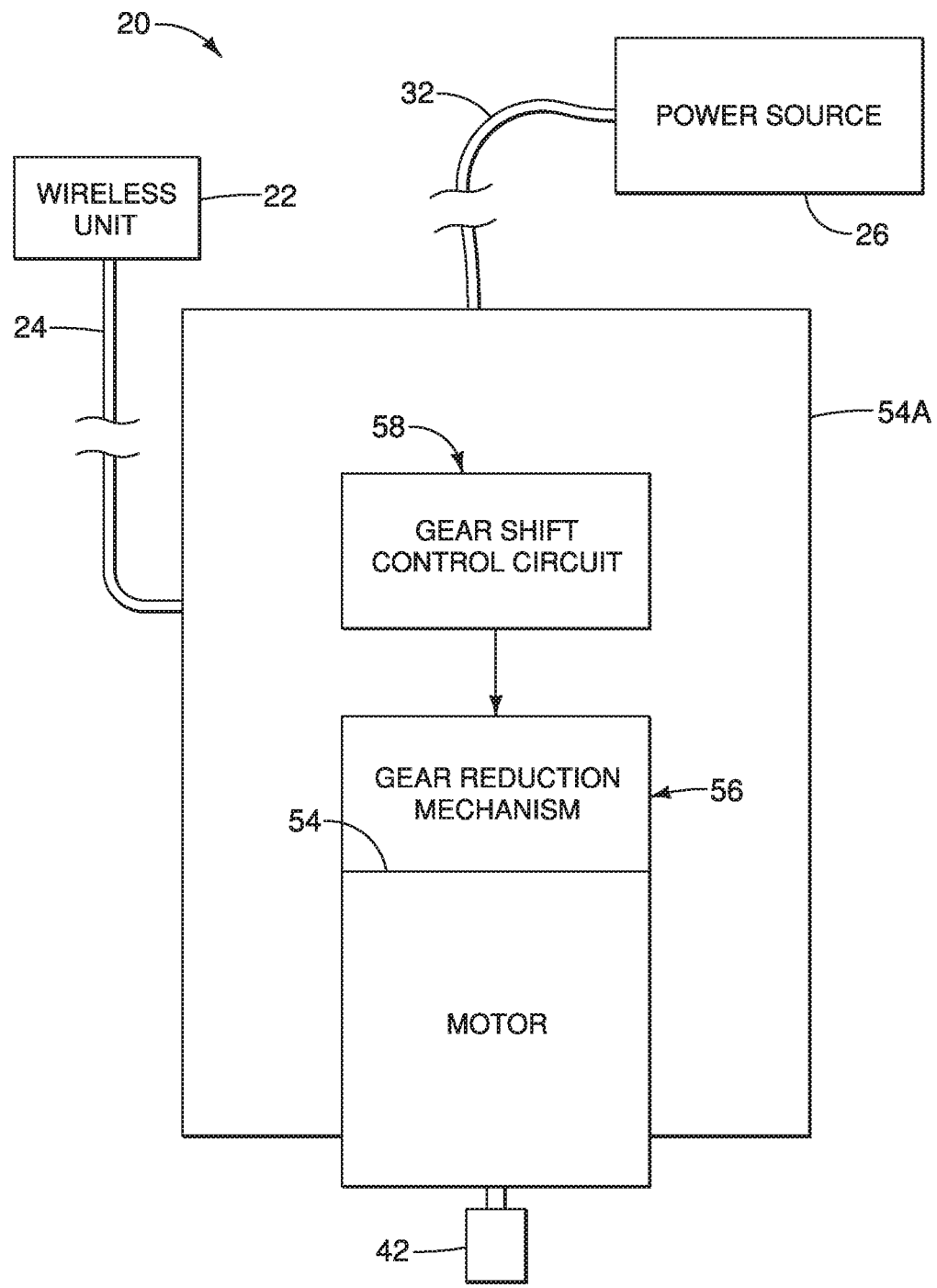
FIG. 3 is a diagrammatic view of the motor unit and the wireless unit of the electric bicycle derailleur illustrated in FIGS. 1 and 2.

The motor unit 20 will now be discussed with reference to FIG. 3. Preferably, the motor unit 20 is a reversible electric motor unit. The motor unit 20 includes a motor 54 configured to move at least one link member (i.e., the first link member 16A in the first embodiment). Preferably, the motor unit 20 further includes the gear reduction mechanism 56 and a gear shift control circuit 58 that are well-known in the art and schematically illustrated in FIG. 3. The motor unit 20 further includes a motor unit housing 54A that houses the motor 54, the gear reduction mechanism 56 and the gear shift control circuit 58.

In the first embodiment, the motor unit 20 is disposed on the base member 12. As shown, the motor unit 20 has the output shaft 42 operatively connected to the first and second link members 16A and 16B to cause relative movement between the first and second link members 16A and 16B and the base member 12. In the first embodiment, the output shaft 42 is also the output shaft of the motor unit 20. In this way, rotation of the output shaft 42 pivots the first and second link members 16A and 16B to move the first and second link members 16A and 16B with respect to the base member 12. More specifically, in the first embodiment, rotation of the output shaft 42 pivots the first link member 16A to cause relative movement of the first and second link members 16A and 16B with respect to the base member 12, which then causes relative movement of the chain guide 18 with respect to the base member 12.

The motor unit 20 can be disposed on the base member 12 via a variety of methods that are known to those skilled in the bicycle field. For example, the motor unit 20 can be disposed on the base member 12, In such a case, as disclosed in U.S. Pat. No. 7,892,122, the motor unit 20 is disposed on a base member. Similarly, in the illustrated embodiment, the motor unit 20 includes the output shaft 42 that drives the saver link 38, which drives the first link member 16A. The motor unit 20 can further include a second pivot shaft (not shown) extending opposite the output shaft 42 from the motor unit 20. The second pivot shaft is pivotally coupled to a second link plate (not shown) of the first link member 16A. Thus, the motor unit 20 is disposed on the base member 12 and drives the first link member 16A. The saver link mechanism is well-known in the bicycle field and will not be further discussed herein.

As stated above, the electric bicycle derailleur 10 further comprises the wireless unit 22 disposed on at least one of the first and second link members 16A and 16B. In the first embodiment, the wireless unit 22 is disposed on the second link member 16B. In particular, the wireless unit 22 is disposed on the second inner surface 16B1 of the second link member 16B.

As shown, the electric conductor 24 electrically connects the wireless unit 22 to the motor unit 20. Preferably, the electric conductor 24 is supported on a surface of the at least one link member. In particular, as shown, the electric conductor 24 is supported on the second inner surface 16B1 of the second link member 16B. Thus, the electric conductor 24 is at least partly disposed on at least one of the first and second link members 16A and 16B. Alternatively, it will be apparent to those skilled in the bicycle field from this disclosure that the electric conductor 24 can be integrated with at least one of the first and second link members 16A or 16B. For example, the first and second link members 16A and 16B can include a bore for receiving the electric conductor 24 through which the electric conductor 24 can extend to connect the motor unit 20 and the wireless unit 22. Given this configuration with the wireless unit 22 disposed on the first and second link members 16A and 16B, the electric bicycle derailleur 10 of the illustrated embodiment can be more compact.

The wireless unit 22 includes a wireless receiver configured to receive a wireless signal. Preferably, the wireless unit 22 is a two-way wireless communication unit that conducts two-way wireless communications using the wireless receiver for wirelessly receiving shift signals and a wireless transmitter for wirelessly transmitting data. In the present embodiment, the wireless unit 22 can wirelessly communicate with other external devices. For example, the wireless unit 22 can wirelessly communicate with an external device ED such as a smart-phone, a tablet computer and a personal computer. The external device ED is configured to update firmware stored in a memory of the gear shift control circuit 58 and to input setting information into the memory of the gear shift control circuit 58. The wireless unit 22 is configured to output log information stored in the gear shift control circuit 58 to the external device ED for displaying the log information on a display part of the external device ED.

The wireless control signals of the wireless unit 22 can be radio frequency (RF) signals or any other type of signal suitable for wireless communications as used in the bicycle field. It should also be understood that the wireless unit 22 can transmit the signals at a particular frequency and/or with an identifier such as a particular code, to distinguish the wireless control signal from other wireless control signals. In this way, the electric bicycle derailleur 10 can recognize which control signals are to be acted upon and which control signals are not to be acted upon. Thus, the electric bicycle derailleur 10 can ignore the control signals from other wireless communications units.

Figure 4:
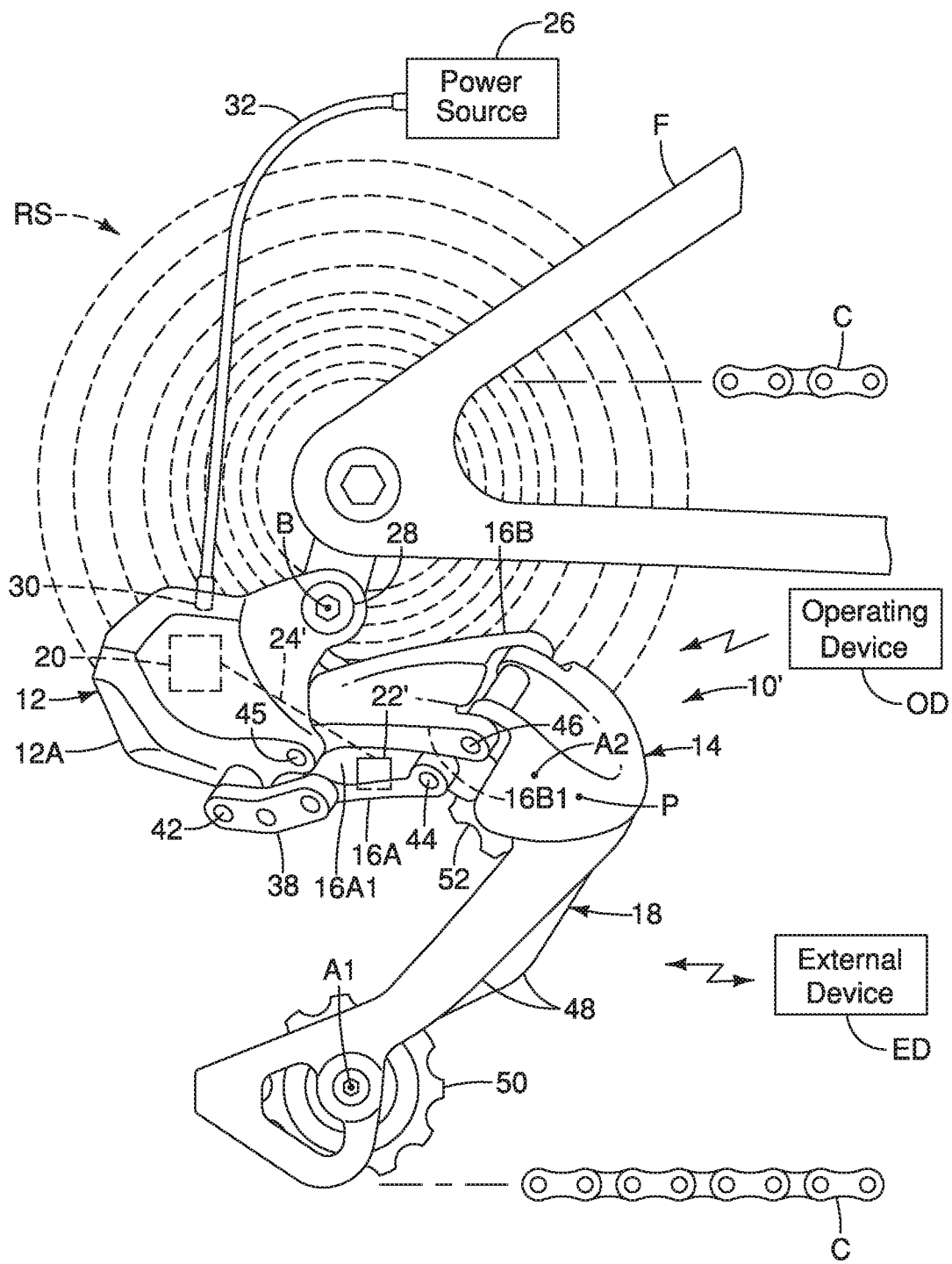
FIG. 4 is a side elevational view of the portion of the bicycle equipped with a modified electric bicycle derailleur of the electric bicycle derailleur of the first illustrated embodiment having a wireless unit disposed on an inner link.

Turning now to FIG. 4, a modified electric bicycle derailleur 10' of the electric bicycle derailleur 10 will now be discussed. The modified electric bicycle derailleur 10' is basically identical to the electric bicycle derailleur 10 except that electric bicycle derailleur 10' includes a wireless unit 22' that is disposed on the first (inner) link member 16A of the first and second link members 16A and 16B. Thus, the modified electric bicycle derailleur 10' includes the motor unit 20 that can be mounted on the base member 12 in the same manner as the electric bicycle derailleur 10. Due to the similarities between the modified electric bicycle derailleur 10' and the electric bicycle derailleur 10, all reference numerals for corresponding components will remain the same except for modified components, which receive the same reference numeral followed by a prime symbol (').

In the modified electric bicycle derailleur 10', the wireless unit 22' is preferably disposed on the first inner surface 16A1 of the first link member 16A by methods understood by those in the bicycle field. In the modified electric bicycle derailleur 10', an electric conductor 24' is partly arranged in the first and second link members 16A and 16B to connect the wireless unit 22' and the motor unit 20.

Figure 5:
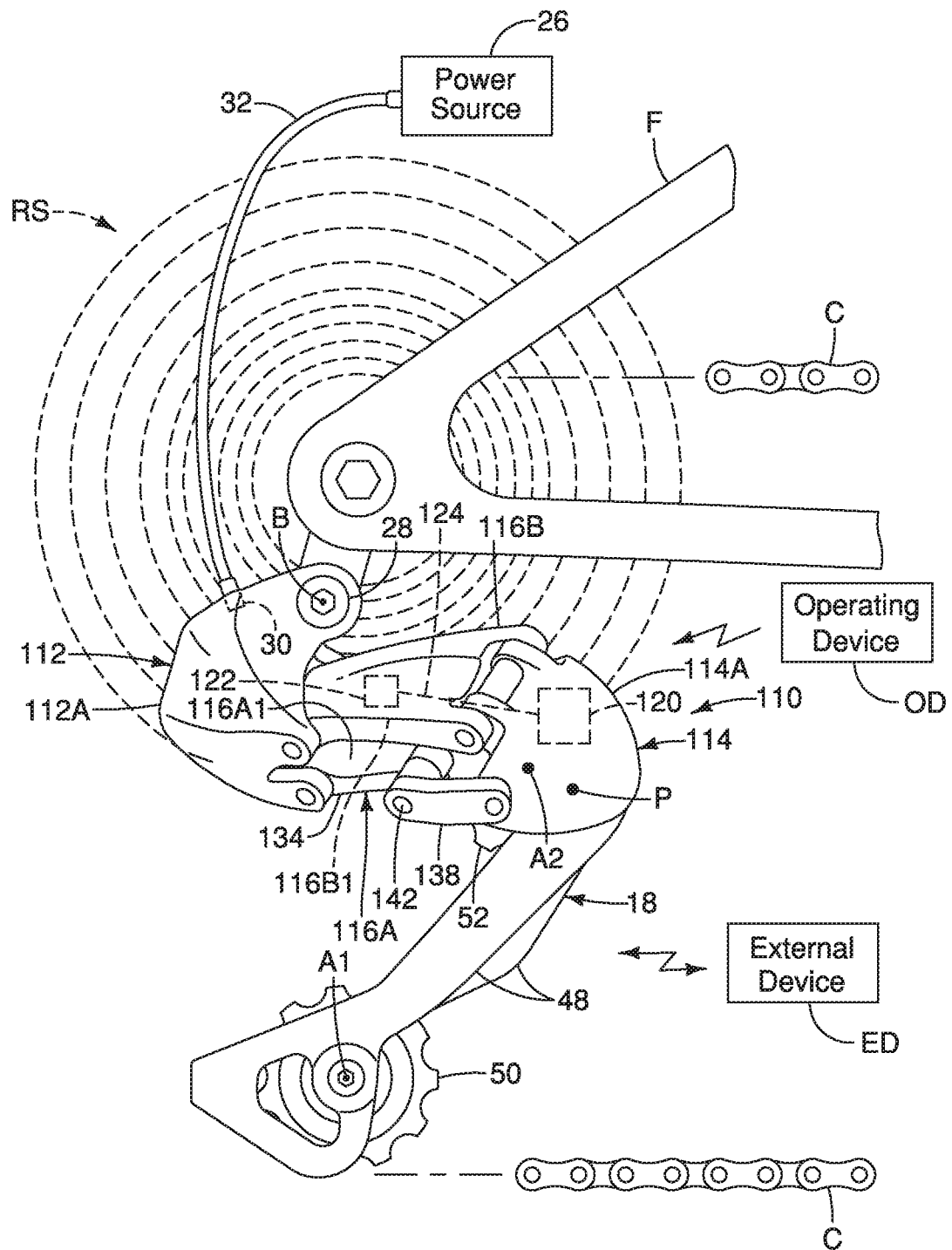
FIG. 5 is a side devotional view of the portion of the bicycle equipped with an electric bicycle derailleur having a motor unit disposed on a movable member and a wireless unit disposed on an outer link in accordance with a second illustrated embodiment.

Referring now to FIG. 5, an electric bicycle derailleur 110 in accordance with a second embodiment will now be discussed. Due to the similarities between the electric bicycle derailleur 110 and the electric bicycle derailleur 10 of the first embodiment, all modified corresponding structures to the electric bicycle derailleur 10 will receive identical reference numerals but increased by 100. Identical structures corresponding to the electrical bicycle derailleur 10 will receive the same reference numerals.

The electric bicycle derailleur 110 comprises a base member 112, a movable member 114 and at least a first link member 116A and a second link member 116B. The first and second link members 1161 and 116B movably connect the base member 112 and the movable member 114 to enable relative movement of the movable member 114 with respect to the base member 112 as the electric bicycle derailleur 110 shifts the chain C in the lateral direction. The electric bicycle derailleur 110 further comprises a chain guide 18 movably coupled to the movable member 114. The electric bicycle derailleur 110 further comprises a motor unit 120. The electric bicycle derailleur 110 further comprises a wireless unit 122. The electric bicycle derailleur 110 further comprises an electric conductor 124 electrically connecting the wireless unit 122 and the motor unit 120. The electric bicycle derailleur 110 further comprises a power source 26 (e.g., the battery) that supplies power to the motor unit 120 and/or the wireless unit 122.

The first link member 116A includes a first inner surface 116A1 and the second link member 116B includes a second inner surface 116B1. The first and second link members 116A and 116B are pivotally connected to the base member 112 and the movable member 114. In particular, the first link member 116A has a first end that is pivotally connected to the base member 112. The first link member 116A has a second end that is pivotally connected to a saver link 138. The saver link 138 is connected to an output shaft 142 of the motor unit 120.

Similar to the first embodiment, the first and second link members 116A and 116B have first ends pivotally connected to the base member 112 and second ends pivotally connected to the movable member 114 to define a four bar linkage arrangement. Thus, the electric bicycle derailleur 110 of the second embodiment is basically identical to the electric bicycle derailleur 10 except that the motor unit 120 is disposed on the movable member 114 and the saver link 138 has been modified to connect the first link member 116A and the movable member 114.

Similar to the electric bicycle derailleur 10 of the first embodiment, the motor unit 120 also preferably includes a motor unit housing that houses a motor, a gear reduction mechanism and a gear shift control circuit. Thus, as shown, the base member 112 of the electric bicycle derailleur 110 is a modified base member with a modified housing; that is smaller than the base member 12 of the first embodiment. The movable member 114 of the electric bicycle derailleur 110 has also been modified to accommodate the motor win 120.

As shown in FIG. 5, the motor unit 120 is disposed on the movable member 114. In particular, the motor unit 120 is disposed inside a housing 114A of the movable member 114. Alternatively, it will be apparent to those skilled in the bicycle field from this disclosure that the motor unit 120 can be disposed on the housing 114A of the movable member 114. For example, the motor unit housing can be mounted to the movable member housing 114A. Thus, the movable member 114 supports the motor unit 120. The motor unit 120 operates to enable relative movement between the first and second link members 116A and 116B and the movable member 114. The motor unit 120 can be disposed on the movable member 114 via a variety of methods that are known in the bicycle field. For example, as disclosed in FIG. 7 of U.S. Pat. No. 7,980,974, the movable member 114 can include a drive housing that houses the motor unit 120 and the components of the motor unit 120. The drive housing includes the output shaft 142 that is connected to the first link member 116A to move the first link member 116A.

In the second embodiment, as shown, the wireless unit 122 is disposed on the second link member 116B that is connected to the motor unit 120 by the electric conductor 124. In particular, the wireless unit 122 is disposed on the second inner surface 116B1 that faces the first inner surface 116A1. Thus, in the second illustrated embodiment, as with the first illustrated embodiment, the electric conductor 124 is partly arranged on the second link member 116B.

Figure 6:
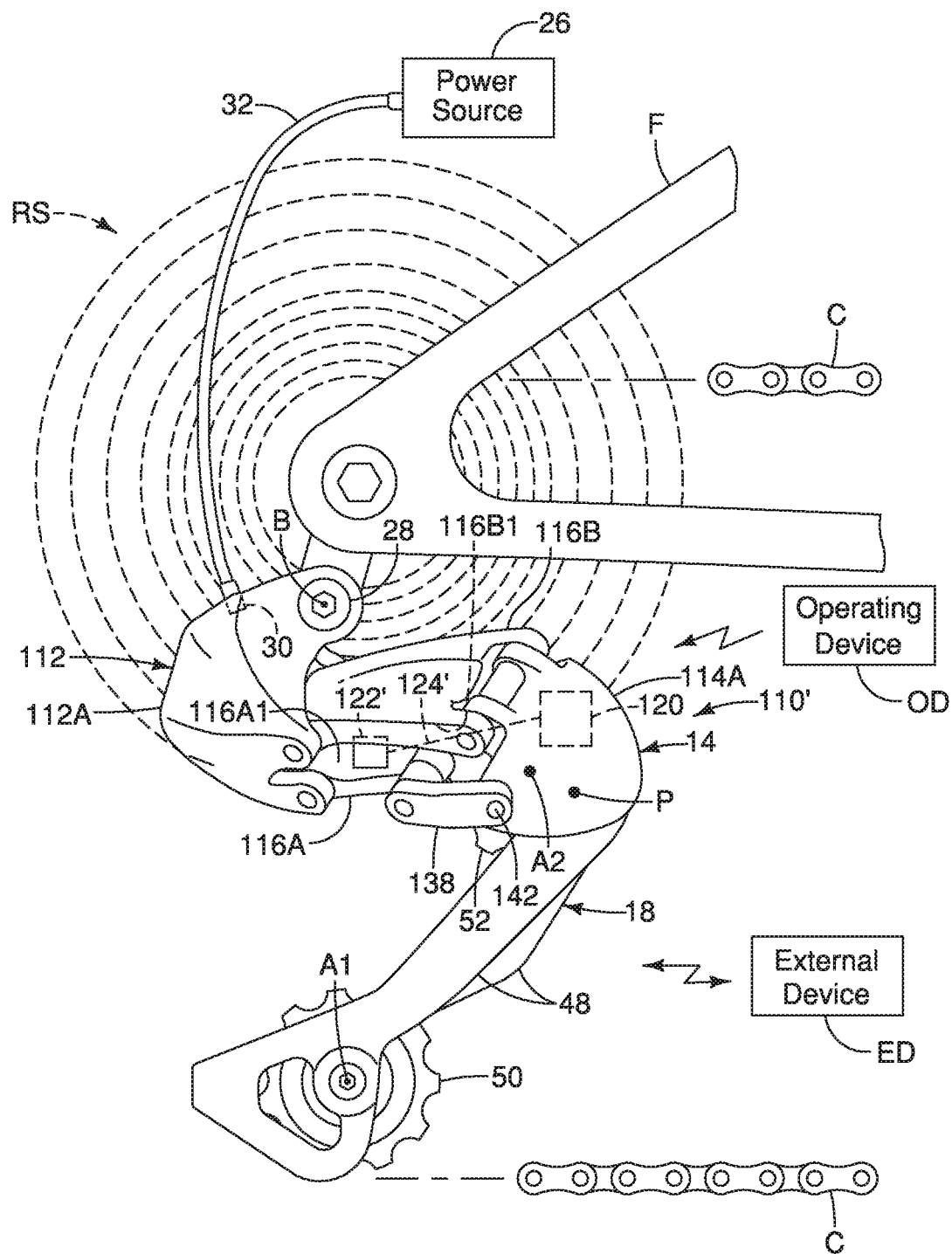
FIG. 6 is a side elevational view of the portion of the bicycle equipped with a modified electric bicycle derailleur of the second illustrated embodiment having a wireless unit disposed on an inner link.

Referring now to FIG. 6, a modified electric bicycle derailleur 110' of the electric bicycle derailleur 110 will now be discussed. Due to the similarity between the modified electric bicycle derailleur 110' and the electric bicycle derailleur 110, all corresponding structures will receive the same reference numerals except for modified components which will receive the same reference numeral but followed by the prime symbol (').

Basically, the modified electric bicycle derailleur 110' is identical in all respects to the electric bicycle derailleur 110 except that the electric bicycle derailleur 110' includes a wireless unit 122' that is disposed on the first link member 116A. In particular, the wireless unit 122' is disposed on the first inner surface 116A1 of the first link member 116A. In the modified electric bicycle derailleur 110', the wireless unit 122' can be disposed on the first link member 116A in a similar manner as that for the electric bicycle derailleur 110 and be electrically connected to the motor unit 120 that is disposed on the movable member 114.

Figure 7:
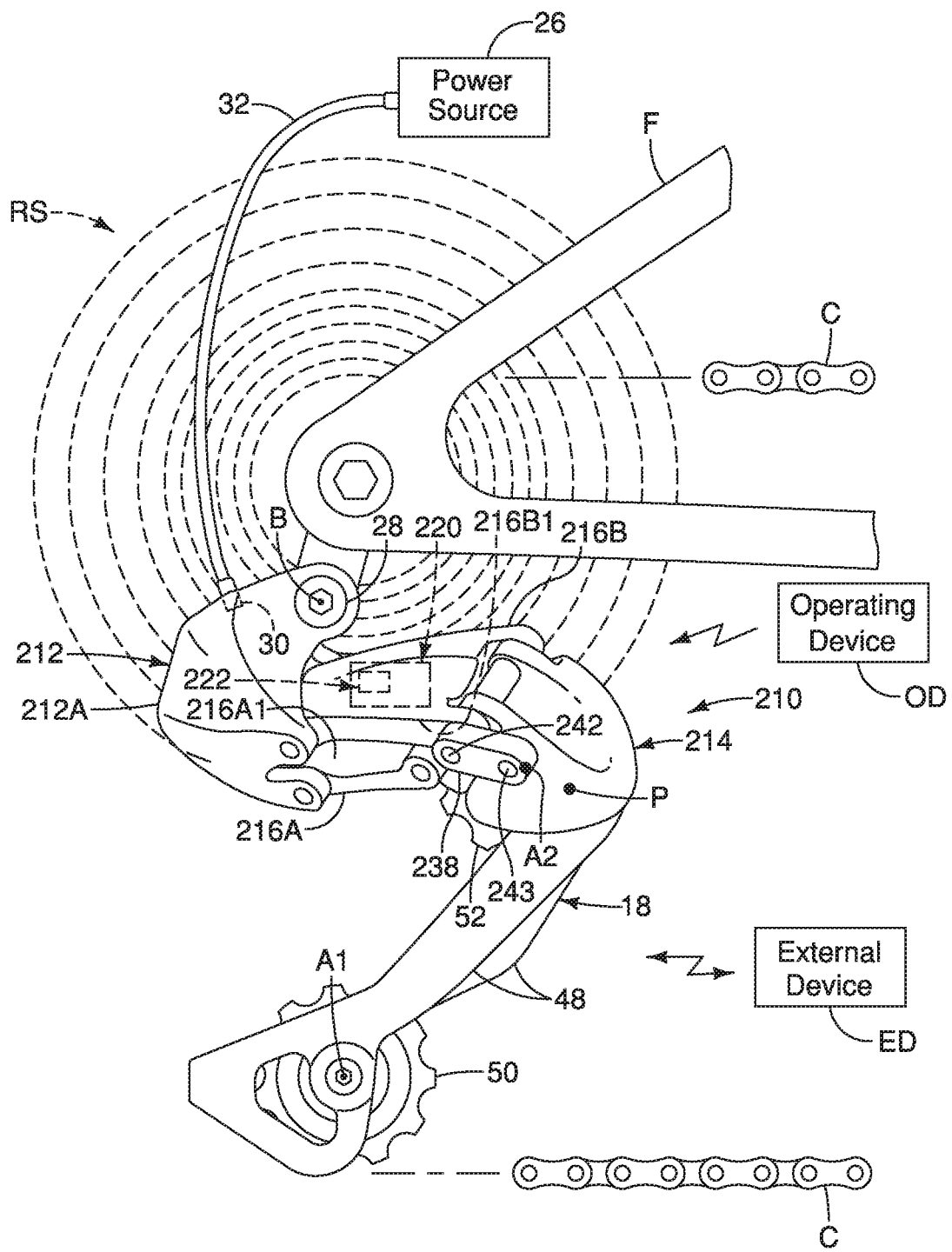
FIG. 7 is a side elevational view of the portion of the bicycle equipped with an electric bicycle derailleur having a motor unit and a wireless unit disposed on an outer link in accordance with a third illustrated embodiment.
Figure 8:
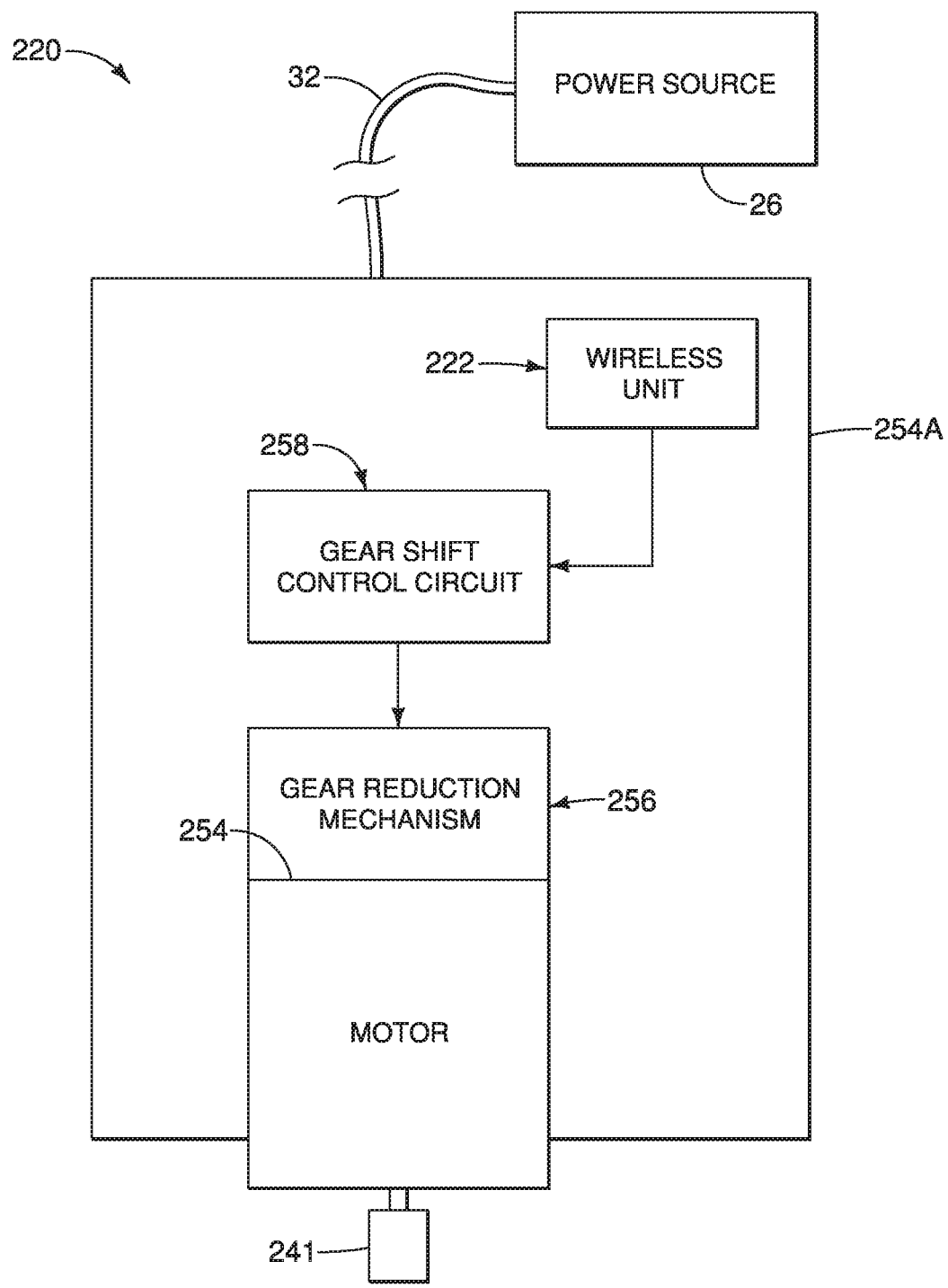
FIG. 8 is a diagrammatic view of the motor unit and the wireless unit of the electric bicycle derailleur of the third illustrated embodiment.

Referring now to FIGS. 7 and 8, an electric bicycle derailleur 210 in accordance with a third embodiment will now be discussed. Due to the similarities between the electric bicycle derailleur 210 and the electric bicycle derailleur 110 of the second embodiment, all corresponding modified structures will receive the same reference numerals but increased by 100. Corresponding structures that are identical to the electric bicycle derailleur 110 will receive the same reference numerals.

The electric bicycle derailleur 210 comprises a base member 212, a movable member 214 and at least a first (inner) link member 216A and a second (outer) link member 216B. The first and second link members 216A and 216B movably connect the base member 212 and the movable member 214 to enable relative movement of the movable member 214 with respect to the base member 212 as the electric bicycle derailleur 210 shifts the chain C in the lateral direction. The electric bicycle derailleur 210 further comprises a chain guide 18 movably coupled to the movable member 214. The electric bicycle derailleur 210 further comprises a motor unit 220. The electric bicycle derailleur 210 further comprises a wireless unit 222. The electric bicycle derailleur 210 further comprises an electric conductor 224 electrically connecting the wireless unit 222 and the motor unit 220. The electric bicycle derailleur 210 further comprises the power source 26 (e.g., a battery) that supplies power to the motor unit 220 and/or the wireless unit 222.

The electric bicycle derailleur 210 is basically identical to the electric bicycle derailleur 110 except that the motor unit 220 is disposed on at least one of the first and second link members 216A and 216B. In other words, the motor unit 220 is disposed on at least one of the first and second link members 216A and 216B to enable relative movement between the first and second link members 216A and 216B and the movable member 214. The first link member 216A has a first inner surface 216A1, and the second link member 216B has a second inner surface 216B1. As shown, the motor unit 220 is disposed on the second link member 216B. Here, in the illustrated embodiment, the motor unit 220 is illustrated as transferring power to the movable member 214 via a saver link 238 connecting the second link member 216B and the movable member 214. Similar to the electric bicycle derailleur 110, an output shaft 242 (that is a pivot pin) of the motor unit 220 connects the second link member 216B and the saver link 238. It will be apparent to those skilled in the art from this disclosure that the saver link 238 can be configured similar to the saver link 38 of the first embodiment by connecting the base member 212 and at least one of first and second link members 216A and 216B to move the first and second link members 216A and 216B relative to the base member 212.

As seen in FIG. 8, similar to the motor unit 220 of the electric bicycle derailleur 10 of the first embodiment, the motor unit 220 includes a motor unit housing 254A, a gear reduction mechanism 256 and a gear shift control circuit 258. These components of the motor unit 220 can be provided on the second link member 216B via methods understood by those skilled in the bicycle field. For example, as disclosed in FIG. 10 of U.S. Pat. No. 6,162,140, the motor unit 20 can be fined into a cylindrical bore (not shown) of the second link member 216B. A series of gears (not shown) is disposed between the second link member 216B and the movable member 214 to move the movable member 214 relative to the first and second link members 216A and 216B.

Also, as shown, the wireless unit 222 is disposed on the second link member 216B. In particular, the wireless unit 222 is disposed on the second inner surface 216B1. Preferably, both the motor unit 220 and the wireless unit 222 are disposed on the second inner surface 216B1 of the second link member 216B. In the third embodiment, the wireless unit 222 can be integrated with the motor unit 220. In particular, as seen in FIG. 8, the wireless unit 222 can be provided in the motor unit housing 254A that houses the motor 254. Alternatively, it will be apparent to those skilled in the bicycle field from this disclosure that the wireless unit 222 can be provided on the gear shift control circuit 258.

Figure 9:
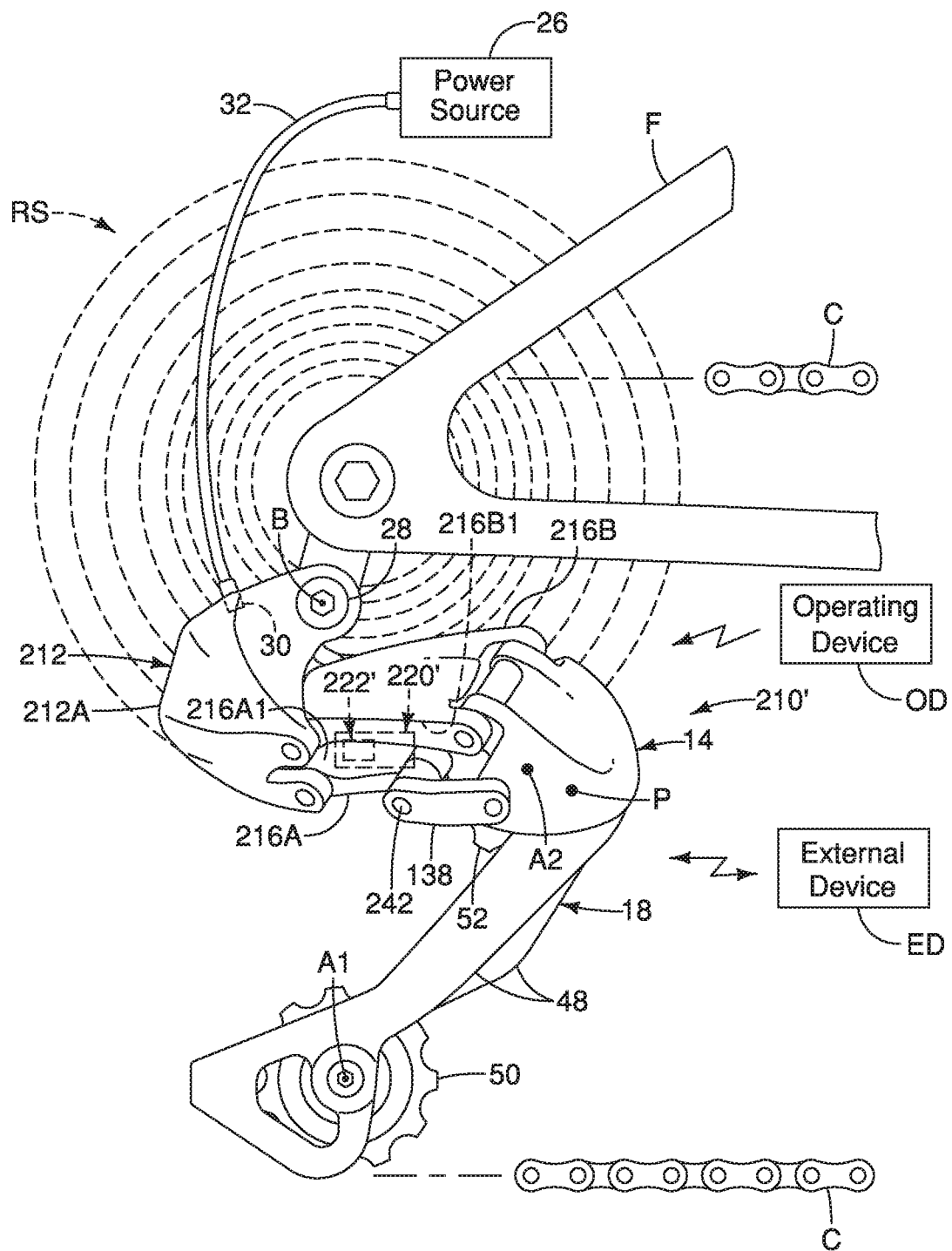
FIG. 9 is a side devotional view of the portion of the bicycle equipped with a modified electric bicycle derailleur of the third illustrated embodiment with a motor unit and a wireless unit disposed on an inner link.

Referring now to FIG. 9, a modified electric bicycle derailleur 210' of the electric bicycle derailleur 210 of the third embodiment will now be discussed. Due to the similarities between the modified electric bicycle derailleur 210' and the electric bicycle derailleur 210 of the third embodiment, all corresponding structures to the electric bicycle derailleur 210 will receive the same reference numerals, except for the modified components which will receive the same reference numerals but followed by the prime symbol (').

The modified electric bicycle derailleur 210' is identical to the electric bicycle derailleur 210 of the third embodiment except that the modified electric bicycle derailleur 210' includes a motor unit 220' that is disposed on the first link member 216A. The modified electric bicycle derailleur 210' further includes a wireless unit 222' disposed on the first link member 216A. In particular, as shown, the wireless unit 222' is disposed on the first inner surface 216A1 of the first link member 216A. The motor unit 220' and the wireless unit 222' can be provided on first link member 216A in a similar manner as discussed for the electric bicycle derailleur 210.

Preferably, the wireless unit 222' and the motor unit 220' is also an integrated unit. For example, the wireless unit 222' can be provided in the motor unit housing similar to that shown in FIG. 8. Thus, as shown in the embodiments described above, the electric bicycle derailleur (10, 10', 110, 110', 210 and 210') can include a motor unit that is disposed on one of the base member, the movable member, and the at least one link member.

Figure 10:
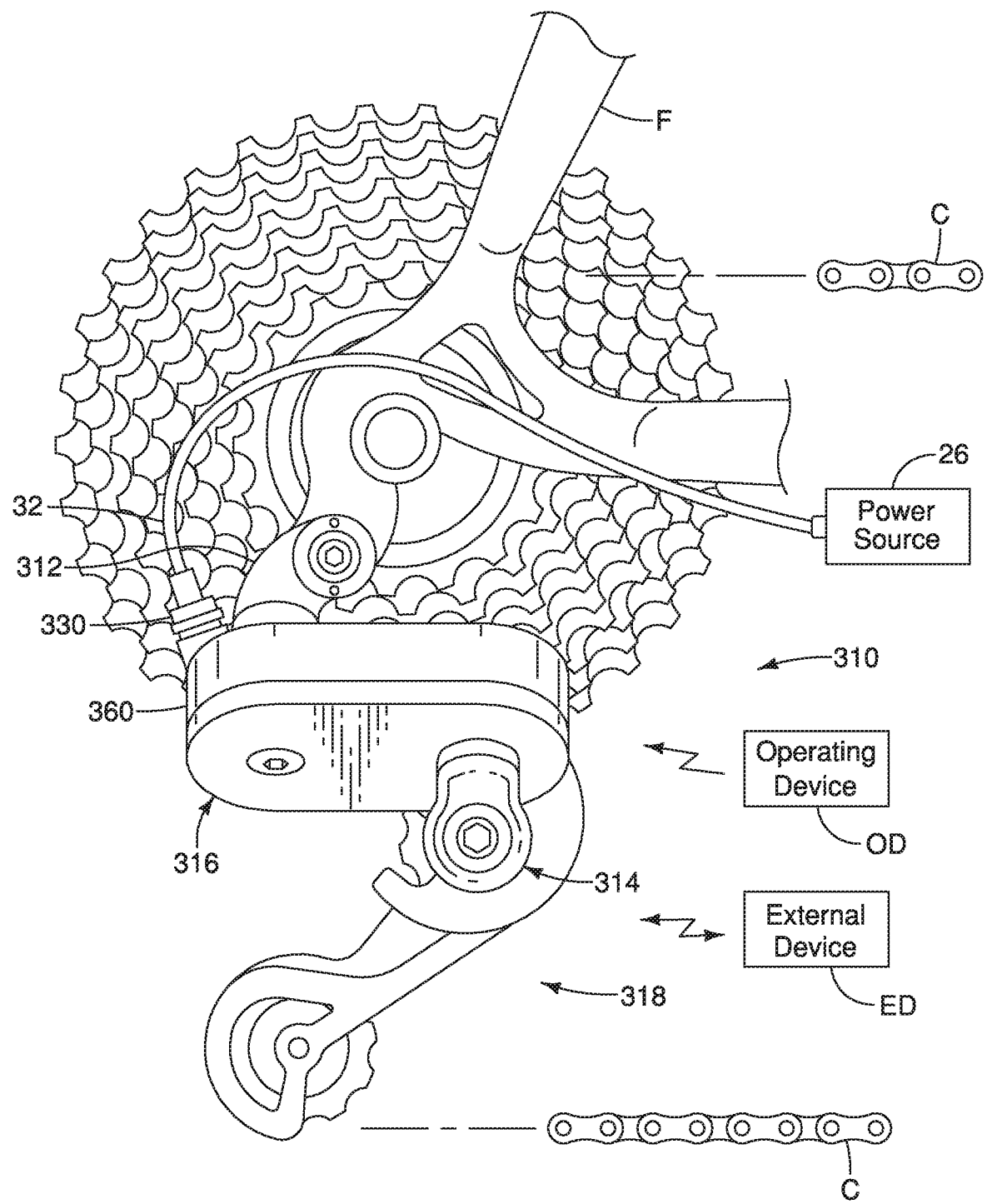
FIG. 10 is a side elevational view of the portion of the bicycle equipped with an electric bicycle derailleur having a linkage with a linkage housing in accordance with a fourth illustrated embodiment.
Figure 11:
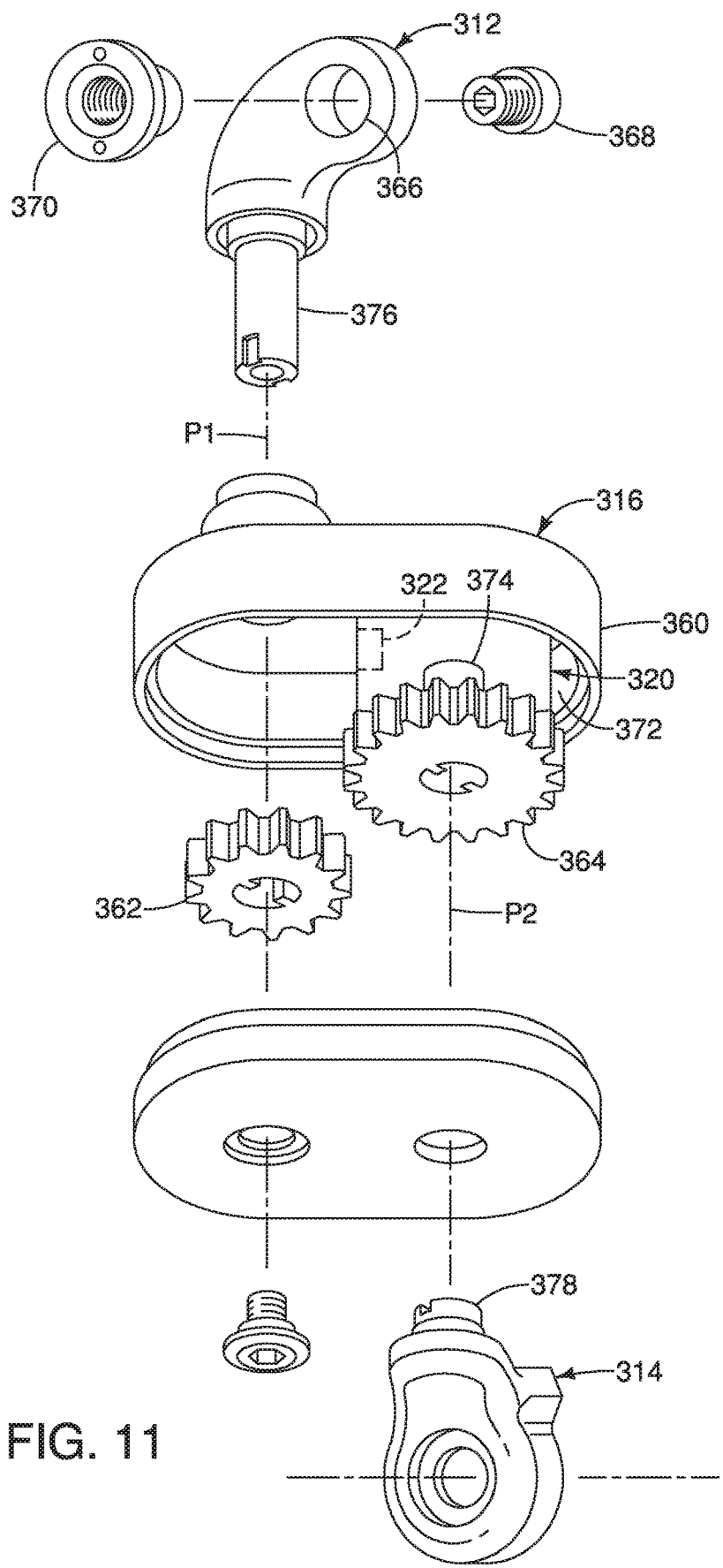
FIG. 11 is an exploded view of the linkage of the electric bicycle derailleur illustrated in FIG. 10, showing the motor unit disposed inside the linkage housing.

Referring now to FIGS. 10 and 11, an electric bicycle derailleur 310 in accordance with a fourth embodiment will now be discussed. For simplicity, all corresponding structures of the electric bicycle derailleur 310 of the fourth embodiment will receive the same reference numerals as the electric bicycle derailleur 210 of the third embodiment but increased by 100.

The electric bicycle derailleur 310 comprises a base member 312, a movable member 314 and at least one link member 316. In the fourth embodiment, the at least one link member 316 is a single linkage that is comprised of a linkage housing 360 having a first gear 362 and a second gear 364. The at least one link member 316 movably connects the base member 312 and the movable member 314 to enable relative movement of the movable member 314 with respect to the base member 312 as the electric bicycle derailleur 310 shifts a chain C in the lateral direction. The electric bicycle derailleur 310 further comprises a motor unit 320. The electric bicycle derailleur 310 further comprises a wireless unit 322. The electric bicycle derailleur 310 further comprises a chain guide 318 movably coupled to the movable member 314. The electric bicycle derailleur 310 further comprises a power source 26 (e.g., a battery) that supplies power to the motor unit 320. Thus, as shown, the base member 312 and the movable member 314 have been modified to accommodate the link member 316 and the linkage housing 360.

The base member 312 is configured to be connected to the bicycle frame F. The base member 312 includes a fastener hole 366 configured to receive a fastener 368 and a nut 370 to mount the base member 312 to the bicycle frame F. The movable member 314 is movably coupled to the base member 312 by the link member 316. The chain guide 318 is movably coupled to the movable member 314. The chain guide 318 is movable relative to the movable member 314 to maintain the chain C in proper tension. The movable member 314 is arranged between a retracted position and an extended position to facilitate moving the chain C between the sprockets.

In the exemplary embodiment illustrated, the link member 316 operatively couples the movable member 314 and the base member 312. The link member 316 includes the first gear 362 and the second gear 364. The first gear 362 is disposed closer to the base member 312 than the second gear 364. The first gear 362 is connected to the base member 312 by a first pivot pin 376 about a first pivot axis P1. The second gear 364 is connected to the movable member 314 by a second pivot pin 378 about a second pivot axis P2.

As seen in FIG. 11, the linkage housing 360 is configured to support the first gear 362, the second gear 364 and the motor unit 320. The linkage housing 360 defines an internal space 372 in which the first gear 362, the second gear 364 and the motor unit 320 are at least partly disposed. A motor output shaft 374 of the motor unit 320 is received by the second gear 364. An axis of rotation of the output shaft 374 is collinear with the second pivot axis A2. Although the second pivot pin 378 and the motor output shaft 374 are shown as separate members, a single unitary member can extend from the motor unit 320 through the second gear 364 to the movable member 314. The first gear 362 is connected to the base member 312. The second gear 364 is connected to the movable member 314.

As previously stated, the linkage housing 360 defines the internal space 372 in which the motor unit 320 at least partly disposed. Similar to the motor units of the previous embodiments, the motor unit 320 can include a motor unit housing, a gear reduction unit and a gear shift control circuit. As shown, the wireless unit 322 is provided in the internal space 372 of the linkage housing 360. Preferably, similar to the motor unit 220 of the third embodiment, the wireless unit 322 is integrated with the motor unit housing. Alternatively, the Wireless unit 322 can be integrated with the gear shift control circuit of the motor unit 320.

In understanding the scope of the present invention, the term "comprising" and its derivatives, as used herein, are intended to be open ended terms. The foregoing also applies to words having similar meanings such as the terms, "including", "having" and their derivatives.

In the present application, the following directional terms "front," "rear," "forward," "rearward," "left," "right," "transverse," "upward" and "downward" as well as any other similar directional terms refer to those directions which are determined on the basis of a user (e.g., a rider) who sits on a saddle (not shown) of a bicycle with facing the bicycle handlebar.

Also it will be understood that although the terms "first" and "second" may be used herein to describe various components these components should not be limited by these terms. These terms are only used to distinguish one component from another. Thus, for example, a first component discussed above could be termed a second component and vice-a-versa without departing from the teachings of the present invention. The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. An electrical bicycle derailleur comprising:
    a base member configured to be mounted to a bicycle frame;
    a chain guide having a pair of chain cage plates;
    a movable member movably arranged relative to the base member;
    at least one link member movably connecting the base member and the movable member, the movable member being movably connected to the at least one link member and the chain guide;
    a motor unit disposed on one of the base member; the movable member; and the at least one link member, the motor unit including a motor configured to move the at least one link member; and
    a wireless unit including a wireless receiver configured to receive a wireless signal, the wireless unit being disposed on the at least one link member.

2. The electrical bicycle derailleur according to claim 1, wherein the motor unit is disposed on the movable member.

3. The electrical bicycle derailleur according to claim 2, wherein the at least one link member includes a first link member and a second link member, the second link member being positioned from the bicycle frame farther than the first link member from the bicycle frame in a state where the electric bicycle derailleur is mounted to the bicycle frame.

4. The electrical bicycle derailleur according to claim 3, wherein the wireless unit is disposed on the first link member.

5. The electrical bicycle derailleur according to claim 4, wherein
    the wireless unit is disposed on a first inner surface of the first link member that faces the second link member in a state where the electric bicycle derailleur is mounted to the bicycle frame.

6. The electrical bicycle derailleur according to claim 3, wherein the wireless unit is disposed on the second link member.

7. The electrical bicycle derailleur according to claim 6, wherein
    the wireless unit is disposed on a second inner surface of the second link member that faces the first link member in a state where the electric bicycle derailleur is mounted to the bicycle frame.

8. The electrical bicycle derailleur according to claim 1, wherein the motor unit is disposed on the at least one link member.

9. The electrical bicycle derailleur according to claim 8, wherein
    the at least one link member includes a first link member and a second link member, the second link member being positioned from the bicycle frame farther than the first link member from the bicycle frame in a state where the electric bicycle derailleur is mounted to the bicycle frame.

10. The electrical bicycle derailleur according to claim 9, wherein the wireless unit is disposed on the first link member.

11. The electrical bicycle derailleur according to claim 10, wherein
    the wireless unit is disposed on a first inner surface of the first link member that faces the second link member in a state where the electric bicycle derailleur is mounted to the bicycle frame.

12. The electrical bicycle derailleur according to claim 10, wherein the motor unit is disposed on the first link member.

13. The electrical bicycle derailleur according to claim 9, wherein the wireless unit is disposed on the second link member.

14. The electrical bicycle derailleur according to claim 13, wherein
    the wireless unit is disposed on a second inner surface of the second link member that faces the first link member in a state where the electric bicycle derailleur is mounted to the bicycle frame.

15. The electrical bicycle derailleur according to claim 13, wherein the motor unit is disposed on the second link member.

16. The electrical bicycle derailleur according to claim 1, further comprising
    an electric conductor electrically connecting the wireless unit and the motor unit.

17. The electrical bicycle derailleur according to claim 16, wherein the electric conductor is at least partly disposed on the at least one link member.

18. The electrical bicycle derailleur according to claim 1, wherein the at least one link member is made from a radio wave transparent material.

19. The electrical bicycle derailleur according to claim 18, wherein the radio wave transparent material includes plastic.

20. An electrical bicycle derailleur comprising:
    a base member configured to be mounted to a bicycle frame;
    a chain guide having a pair of chain cage plates;
    a movable member movably arranged relative to the base member;
    at least one link member movably connecting the base member and the movable member, the movable member being movably connected to the at least one link member and the chain guide;
    a motor unit including a motor configured to move the movable member relative to the base member; and a wireless unit including a wireless receiver configured to receive a wireless signal, the wireless unit being disposed on the at least one link member.

21. An electrical bicycle derailleur
a base member configured to be mounted to a bicycle frame:
a movable member movably arranged relative to the base member;
at least one link member movably connecting the base member and the movable member;
a motor unit disposed on the base member, the motor unit including a motor configured to move the at least one link member and
a wireless unit including a wireless receiver configured to receive a wireless signal, the wireless unit being disposed on the at least one link member.

22. The electrical bicycle derailleur according to claim 21, wherein
the at least one link member includes a first link member and a second link member, the second link member being positioned from the bicycle frame farther than the first link member from the bicycle frame in a state where the electric bicycle derailleur is mounted to the bicycle frame.

23. The electrical bicycle derailleur according to claim 22, wherein the wireless unit is disposed on the first link member.

24. The electrical bicycle derailleur according to claim 23, wherein
the wireless unit is disposed on a first inner surface of the first link member that faces the second link member in a state where the electric bicycle derailleur is mounted to the bicycle frame.

25. The electrical bicycle derailleur according to claim 22, wherein the wireless unit is disposed on the second link member.

26. The electrical bicycle derailleur according to claim 25, wherein
the wireless unit is disposed on a second inner surface of the second link member that faces the first link member in a state where the electric bicycle derailleur is mounted to the bicycle frame.

* * * * *